United States Patent
Cruz-Hernandez

(10) Patent No.: US 10,031,580 B2
(45) Date of Patent: Jul. 24, 2018

(54) SYSTEMS AND METHODS FOR HAPTICALLY-ENABLED NEURAL INTERFACES

(71) Applicant: Immersion Corporation, San Jose, CA (US)

(72) Inventor: Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 158 days.

(21) Appl. No.: 14/994,720

(22) Filed: Jan. 13, 2016

(65) Prior Publication Data

US 2017/0199569 A1    Jul. 13, 2017

(51) Int. Cl.
*G06F 3/01*    (2006.01)

(52) U.S. Cl.
CPC .............. *G06F 3/015* (2013.01); *G06F 3/016* (2013.01)

(58) Field of Classification Search
CPC ................................. G06F 3/015; G06F 3/016
See application file for complete search history.

(56) References Cited

U.S. PATENT DOCUMENTS

| | | | |
|---|---|---|---|
| 7,636,080 B2 | 12/2009 | Rosenberg | |
| 7,930,628 B2 | 4/2011 | Eves et al. | |
| 8,290,596 B2 | 10/2012 | Wei et al. | |
| 8,508,469 B1 | 8/2013 | Rosenberg et al. | |
| 2008/0059138 A1* | 3/2008 | Tremblay | G06F 3/011 703/11 |
| 2009/0088659 A1 | 4/2009 | Graham et al. | |
| 2015/0187188 A1 | 7/2015 | Raskin | |
| 2015/0268724 A1 | 9/2015 | Levesque et al. | |
| 2015/0316985 A1 | 11/2015 | Levesque et al. | |
| 2015/0346810 A1 | 12/2015 | Urbach | |
| 2015/0364018 A1 | 12/2015 | Mirov et al. | |
| 2016/0235323 A1* | 8/2016 | Tadi | A61B 5/7285 |

FOREIGN PATENT DOCUMENTS

| | | |
|---|---|---|
| EP | 2 552 304 A1 | 2/2013 |
| EP | 2 897 026 A1 | 7/2015 |

OTHER PUBLICATIONS

European Patent Office Application No. 17151380.7, Extended European Search Report dated Jun. 8, 2017.

(Continued)

*Primary Examiner* — Dmitriy Bolotin
(74) *Attorney, Agent, or Firm* — Kilpatrick Townsend & Stockton LLP

(57) ABSTRACT

One illustrative system disclosed herein includes a processor configured to receive a sensor signal from a neural interface configured to detect an electrical signal associated with a nervous system. The processor is also configured to determine an interaction in with a virtual object in a virtual environment based on the sensor signal. The processor is also configured to determine a haptic effect based at least in part on the interaction with the virtual object in the virtual environment. The processor is also configured to transmit a haptic signal associated with the haptic effect. The illustrative system further includes a haptic output device configured to receive the haptic signal and output the haptic effect.

24 Claims, 5 Drawing Sheets

(56) References Cited

OTHER PUBLICATIONS

Ahu, M. et al., A Review of Brain-Computer Interface Games and an Opinion Survey from Researchers, Developers and Users, Sensors, 2014, 14(8): 14601-14633.

Ferreira, A. et al., A Survey of Interactive Systems based on Brain-Computer Interfaces, SBC Journal of 3D Interactive Systems, 2013, 4(1), pp. 3-13.

Glaviano, N. et al., Influence of Patterned Electrical Neuromuscular Stimulation on Quadriceps Activation in Individuals with Knee Joint injury, Int. J. Sports Phys. Ther., 2014, 9(7):915-23.

Grau, C. et al., Conscious Brain-to-Brain Communication in Humans Using Non-Invasive Technologies, PLOS One, 2014, 9(8), e105225.

Gulick, D. et al., Effect of Patterned Electrical Neuromuscular Stimulation on Vertical Jump in Collegiate Athletes, Sports Health. Mar. 2011; 3(2): 152-157.

Pais-Vieira, M. et al., A Brain to Brain Interface for Real-Time Sharing of Sensorimotor Information, Sci Rep., 2013, 3:1319.

Rao, R. et al. A Direct Brain-to-Brain Interface in Humans, PLOS One, 2014, 9(11), e111332.

Sanders, R. et al., Scientists decode brain waves to eavesdrop on what we hear, web page at http://news.berkeley.edu/2012/01/31/scientists-decode-brain-waves-to-eavesdrop-on-what-we-hear/, as available via the Internet and dated Jan 31, 2012.

Suppes, P. et al., Invariance of brain-wave representations of simple visual images and their names, PNAS, 1999, 96(25), 14658-14663.

Suppes, P. et al., Brain-wave representation of words by superposition of a few sine waves, PNAS, 2000, 97(15), 8738-8743.

Tucker, P., Actual Telepathy on One Step Closer to the Battlefield, Defense One, web page at http://www.defenseone.com/ideas/2014/09/actual-telepathy-one-step-closer-battlefield/92954/, as available via the Internet, dated Sep. 2, 2014.

Wikipedia, Brain-Computer Interface, webpage at https://en.wikipedia.org/wiki/Brain%E2%80%93computer_interface, as available via the Internet.

\* cited by examiner

SYSTEMS AND METHODS FOR HAPTICALLY-ENABLED NEURAL INTERFACES

FIELD OF THE INVENTION

The present invention relates to the field of user interface devices. More specifically, the present invention relates to haptically-enabled neural interfaces.

BACKGROUND

As computer-based systems become more prevalent, researchers are exploring new interfaces through which users can interact with these systems. One recently developed interface is a neural interface, such as a brain-computer interface (BCI). A BCI can include a direct communication pathway between a user's brain and an external computing device. Some BCIs use probes or electrodes implanted into the user's brain or skull, which transmit electrical signals directly from the user's brain to the external computing device. Other BCIs use sensors coupled to the outside of the user's head (e.g., to the user's forehead), which detect electrical signals (e.g., electromagnetic waves) from the user's brain through the user's skull and transmit sensor signals to the external computing device. Neural interfaces may be improved by including haptic capability.

SUMMARY

Embodiments of the present disclosure comprise haptically-enabled neural interfaces. In one embodiment, a system of the present disclosure may comprise a processor configured to receive the sensor signal from a neural interface configured to detect an electrical signal associated with a nervous system. The processor may also be configured to determine an interaction with a virtual object in a virtual environment based on the sensor signal. The processor may also be configured to determine a haptic effect based at least in part on the interaction with the virtual object in the virtual environment. The processor may also be configured to transmit a haptic signal associated with the haptic effect. The system may further comprise a haptic output device configured to receive the haptic signal and output the haptic effect.

In another embodiment, a method of the present disclosure may comprise: receiving a sensor signal from a neural interface configured to detect an electrical signal associated with a nervous system. The method may also comprise determining an interaction with a virtual object in a virtual environment based on the sensor signal. The method may also comprise determining a haptic effect based at least in part on the interaction with the virtual object in the virtual environment. The method may further comprise transmitting a haptic signal associated with the haptic effect to a haptic output device. The haptic output device may be configured to receive the haptic signal and output the haptic effect. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Haptically-Enabled Neural Interfaces

Figure 1:
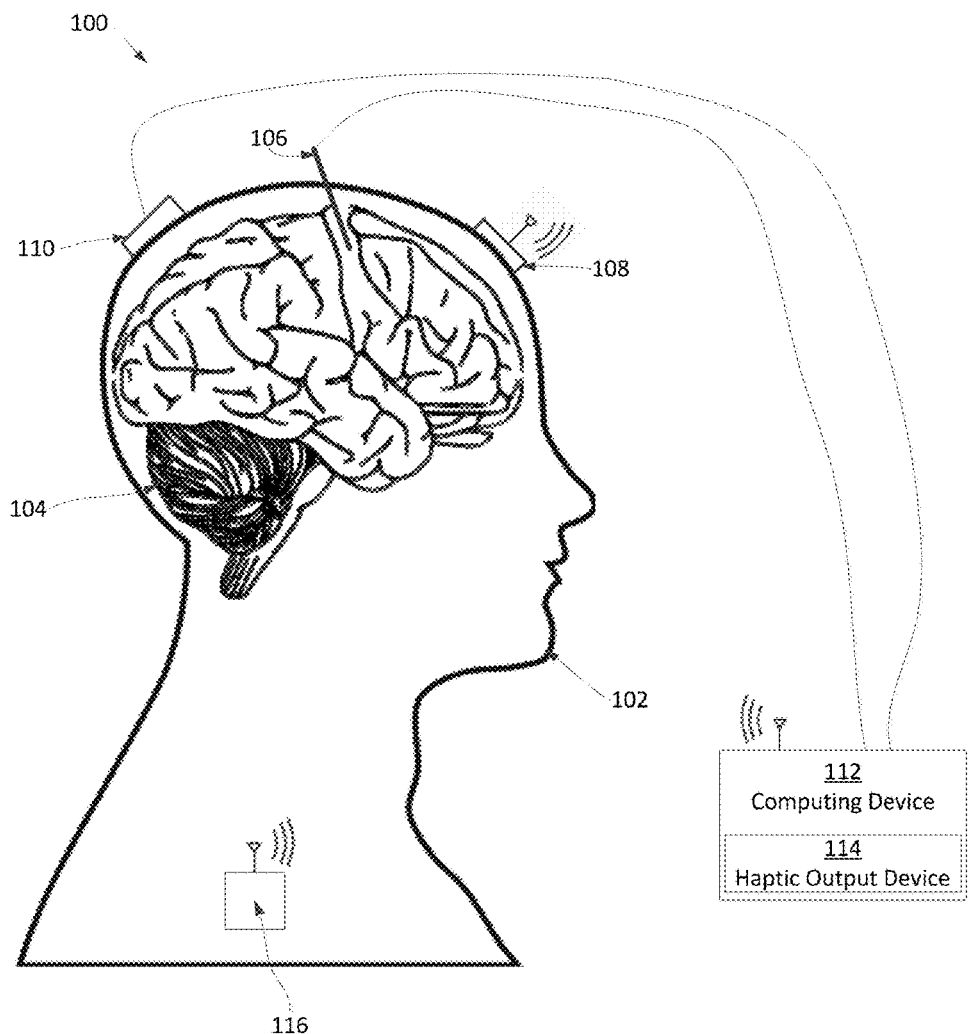
FIG. 1 shows an illustrative embodiment of a system for haptically-enabled neural interfaces.

FIG. 1 shows an illustrative embodiment of a system 100 for haptically-enabled neural interfaces. The system 100 comprises a computing device 112. The system 100 also comprises one or more neural sensors 106, 108, 110 in electrical communication with (e.g., in wired or wireless communication with) the computing device 112. The neural sensors 106, 108, 110 are configured to electrically couple with at least a portion of a user's nervous system, such as the user's brain 104, spine, and/or nerves. When the neural sensors 106, 108, 110 are positioned for detecting brain signals from the user's brain 104, the system 100 can be referred to as a Brain-Computer Interface (BCI). But embodiments are not limited to brain-computer interfaces, and the system 100 may comprise any number and configuration of neural sensors 106, 110, 108 positioned (e.g., anywhere on, or near, the user's body) for detecting neural signals propagating through at least a portion of the user's nervous system.

In the embodiment shown in FIG. 1, the system 100 comprises a neural sensor 106 (e.g., an electrode) positioned within the user's skull and/or directly coupled to the user's brain 104. In some embodiments, the neural sensor 106 is directly implanted into a portion of the user's brain 104. Such a neural sensor 106 may contact the user's brain 104 and receive electrical signals directly from the user's brain 104. Additionally or alternatively, the system 100 may comprise one or more neural sensors 108, 110 externally coupled to the user's skull (e.g., to the outside of the user's head). For example, in the illustrative embodiment, the system 100 comprises one neural sensor 108 coupled to the user's forehead and another neural sensor 110 coupled to the back or top of the users head. Such neural sensors 108, 110 may detect electrical signals (e.g., neural signals) output by the user's brain 104 through the user's skull and/or scalp. The neural sensors 106, 108, 110 are configured to transmit sensor signals associated with the electrical signals output by the user's brain 104, or otherwise associated with the user's nervous system, to the computing device 112.

In the illustrative embodiment, the computing device 112 is configured to receive sensor signals from the neural sensors 106, 108, 110 and determine one or more haptic effects (e.g., textures, vibrations, stroking sensations, stinging sensations, and/or changes in a perceived coefficient of friction) based on the sensor signals. The computing device 112 is configured to transmit one or more haptic signals associated with the haptic effects to one or more haptic output devices 114, 116. The haptic output devices 114, 116 are configured to receive haptic signals from the computing device 112 and output the haptic effects.

In some embodiments, the computing device 112 may comprise the haptic output device 114. In such an embodiment, the user 102 may grasp or hold the computing device 112 to perceive haptic effects output by haptic output device 114.

For example, in some embodiments, the computing device 112 generates a virtual environment. As used herein, a virtual environment comprises an environment that is partially or entirely virtual. For example, a virtual environment can include an augmented reality environment, a virtual reality environment, a video game environment, etc. In one such embodiment, the computing device 112 may execute a video game, such as a virtual military game. The computing device 112 may display content associated with the video game on a display. For example, the computing device 112 may display a virtual war zone associated with the video game, along with a virtual object (e.g., a character, vehicle, or weapon) that is controllable by the user 102. In some embodiments, the computing device 112 receives sensor signals from the neural sensors 106, 108, 110 and determines an interaction with and/or manipulation of the virtual object within the virtual environment based on the sensor signals. The computing device 112 may cause the interaction and/or manipulation to occur within the virtual environment. Thus, the user may be able to interact with and/or manipulate the virtual object with the user's mind.

In some embodiments, the computing device 112 can determine a haptic effect based on the interaction and/or manipulation of the virtual object within the virtual environment and cause the haptic effect to be output. For example, the computing device 112 may receive sensor signals from the neural sensors 106, 108, 110 and, based on the sensor signals, determine that the virtual object should move, e.g., forward over bumpy terrain. In the illustrative embodiment, the computing device 112 also determines and outputs haptic effects associated with the movement of the virtual object. For example, as the virtual object traverses the bumpy terrain, the computing device 112 may determine and output one or more vibrations configured to, e.g., simulate the bumpy terrain. In this manner, the user 102 can interact with and/or manipulate virtual objects via signals from the user's brain 104 and receive associated haptic effects.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Haptically-Enabled Neural Interfaces

Figure 2:
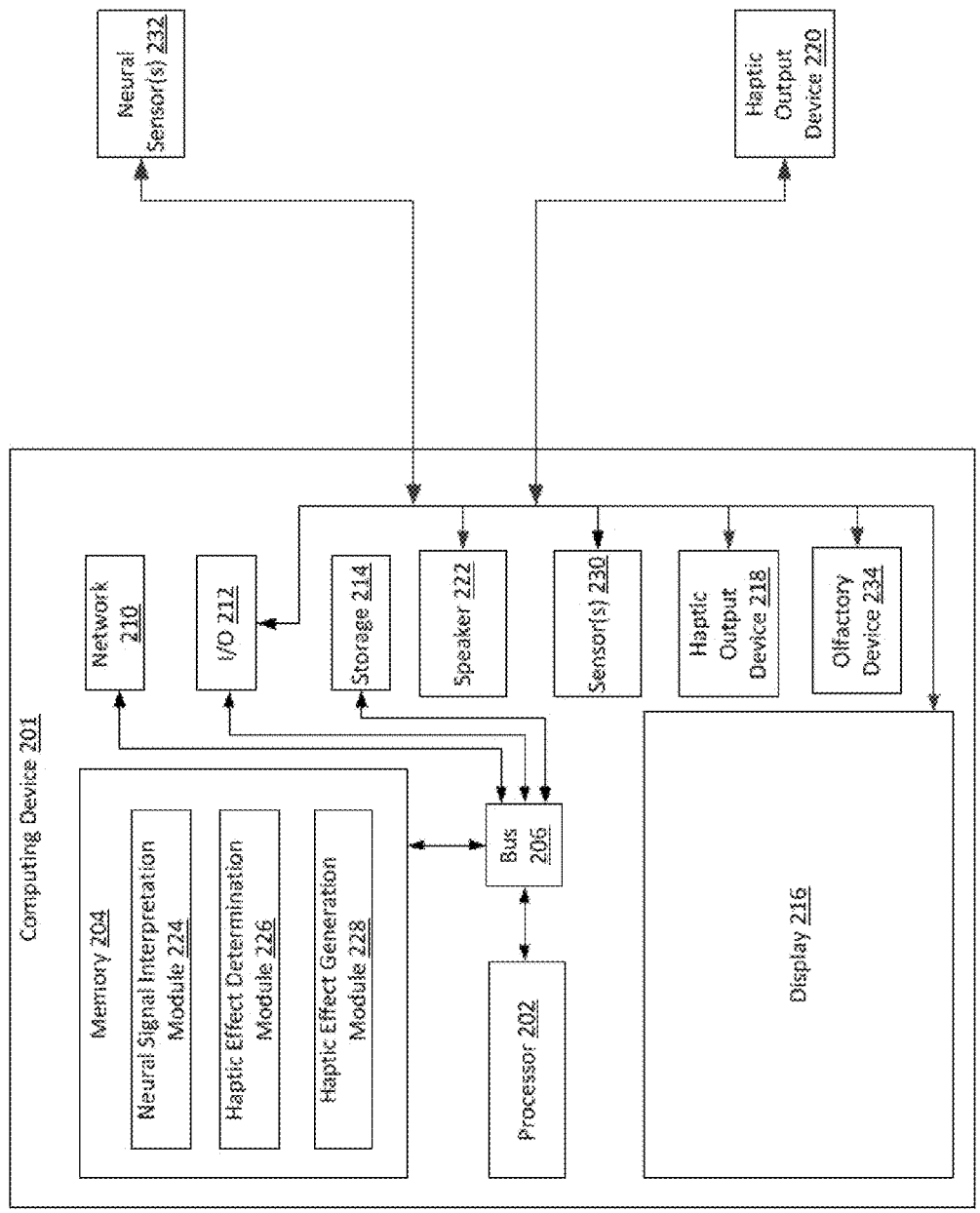
FIG. 2 is a block diagram showing a system for haptically-enabled neural interfaces according to one embodiment.

FIG. 2 is a block diagram showing a system for haptically-enabled neural interfaces haptic effects according to one embodiment. The system comprises a computing device 201. In some embodiments, the computing device 201 comprises a head-mounted computing device, mobile device (e.g., a smartphone, tablet, e-reader, or laptop computer), desktop computer, or a portable gaming device. In other embodiments, the computing device 201 may comprise a wearable device (e.g., a ring, a shoe, an armband, a sleeve, a jacket, glasses, a glove, a watch, a wristband, a bracelet, an article of clothing, a hat, a headband, and/or jewelry).

In some embodiments, the components (e.g., the processor 202, network devices 210, sensor 230, etc.) of the computing device 201 may be integrated into a single housing. In other embodiments, the components may be distributed (e.g., among multiple housings or locations) and in electrical communication with one another. The computing device 201 may or may not comprise all of the components depicted in FIG. 2. For example, in some embodiments, the computing device 201 may no comprise the speaker 22, olfactory device 234, and display 216.

In the embodiment shown in FIG. 2, the computing device 201 comprises a processor 202 in communication with other hardware via bus 206. A memory 204, which can comprise any suitable tangible (and non-transitory) computer-readable medium such as RAM, ROM, EEPROM, or the like, embodies program components that configure operation of the computing device 201. In the embodiment shown, computing device 201 further includes one or more network devices 210, input/output (I/O) interface components 212, and storage 214.

Network device 210 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 212 may be used to facilitate wired or wireless connection to devices such as one or more displays 216, game controllers, keyboards, mice, joysticks, cameras, buttons, speakers, microphones, and/or other hardware used to input data or output data. Storage 214 represents nonvolatile storage such as magnetic, optical, or other storage media included in computing device 201 or coupled to processor 202.

In some embodiments, the computing device 201 comprises one or more sensors 230. The sensor 230 is configured to transmit sensor 230 signals to processor 202. The sensors 230 may comprise, for example, a camera, a gyroscope, an accelerometer, a global positioning system (GPS) unit, a range sensor, or a depth sensor. In some embodiments, the computing device 201 may manipulate a virtual object and/or generate a haptic effect based on sensor signals from sensor 230.

The computing device 201 may also comprise a display 216, a speaker 222, and/or an olfactory device 234. The display 216 comprises any components configured to receive a video signal (e.g., from the processor 202) and output one or more images to a user. The display 216 may comprise, for example, a head-mounted display, a television, a projector, a computer monitor, and/or a liquid crystal display (LCD). In some embodiments, the display 216 may be integrated with a touch-sensitive surface to form a touch-screen display. The speaker 222 comprises any components configured to receive an audio signal (e.g., from the processor 202) and output one or more sounds. The olfactory device 234 comprises components configured to receive an olfactory signal (e.g., from the processor 202) and output one or more smells perceivable by the user. The olfactory device 234 may comprise any number and configuration of scents, perfumes, liquids, solids, gels, and/or gasses for generating one or more smells. The olfactory device 234 may receive the olfactory signal and output one or more of the scents, perfumes, liquids, solids, gels, and/or gasses to generate a target smell.

The system also comprises a neural sensor 232. The neural sensor 232 is configured to detect electrical signals (e.g., neural signals) from a user's nervous system and transmit one or more associated sensor signals to the processor 202. The neural sensor 232 may be in communication with the processor 202 via a wired interface or a wireless interface, such as IEEE 802.11, Bluetooth, or a radio interface. The neural sensor 232 may comprise one or more probes; electrodes, such as electroencephalogram (EEG) electrodes; spectroscopic sensors; a magnetic resonance imaging system (e.g., a fMRI systems); and/or capacitive sensors. Additionally or alternatively, the neural sensor 232 may comprise a battery and/or other power source, a processor, memory, an electrical stimulation device, a magnetometer, and/or other components.

In some embodiments, the neural sensor 232 comprises an output device. The neural sensor 232 may be able to stimulate the at least a portion of the user's nervous system (e.g., the user's brain) to cause the user to perceive sensations (e.g., tastes, smells, visuals, sounds, and/or tactile sensations) that may not actually be present and/or physically detected by the user. For example, the neural sensor 232 may be configured to receive a haptic signal from the processor 202 and responsively stimulate the user's brain, or another body part, in a manner configured to cause the user to perceive a tactile sensation that may not actually be physically present. Such a tactile sensation can be referred to as an apparent haptic effect. For example, the neural sensor 232 may stimulate the user's brain, or nerves in the user's arm, in a manner configured to cause the user to perceive a pin prick on the user's arm, even though a pin may not actually have actually pricked the user's arm.

In some embodiments, the neural sensor 232 can additionally or alternatively stimulate the user's nervous system in a manner configured to cause the user to perceive a taste, smell, visual, sound, and/or other sensation. For example, the neural sensor 232 may comprise an electrical stimulation device configured to apply one or more pulses of electricity to the user's brain for causing the user to perceive a visual, auditory, olfactory, or other sensation.

In some embodiments, the neural sensor 232 can use transcranial magnetic stimulation (TMS) to generate a sensation. For example, the neural sensor 232 can include a 90 mm MagStim™ circle coil. The neural sensor 232 can be positioned (e.g., flush against the user's head) to stimulate the motor cortex region of the user's brain. The processor 202 can cause an electrical signal (e.g., comprising one or more pulses) to be transmitted to the neural sensor 232. In some embodiments, the processor 202 can operate a stimulation device (e.g., a Magstim™ magnetic stimulator) to cause the stimulation device to transmit the electrical signal to the neural sensor 232. The neural sensor 232 can generate an electromagnetic field in response to the electrical signal. The electromagnetic field may induce an electric current in the motor cortex region of the user's brain, e.g., causing the user to move a body part or perceive that the user has moved a body part. In some embodiments, processor 202 can transmit a signal configured to cause the stimulation device to stimulate the user's brain with between 58% and 65% of the maximum possible output (e.g., 2.0 T) of the stimulation device. This may cause the user to perceive a particular sensation.

The system further includes one or more haptic output devices 218, 220 in communication with processor 202. Haptic output devices 218, 220 are configured to output haptic effects in response to a haptic signal. In some embodiments, the haptic output devices 218, 220 are configured to output a haptic effect comprising, for example, a vibration, a change in a perceived coefficient of friction, a simulated texture, a stinging sensation, and/or a surface deformation. Further, some haptic effects may use multiple haptic output devices 218, 220 of the same or different types in sequence and/or in concert.

In some embodiments, the haptic output devices 218, 220 may output haptic effects by vibrating the computing device 201 or a component of computing device 201. In such embodiments, the haptic output devices 218, 220 may comprise e.g., one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

The computing device 201 may comprise an internal haptic output device 218. Additionally or alternatively, the computing device 201 may be in wired or wireless communication with a haptic output device 220 that is remote from computing device 201. For example, in the embodiment shown in FIG. 2, haptic output device 220 is external to and in communication with computing device 201 via a wired interface, such as Ethernet, USB, or IEEE 1394. In other embodiments, haptic output device 220 may be in communication with the computing device 201 via a wireless interface, such as IEEE 802.11, Bluetooth, or a radio interface. In some embodiments, the haptic output device 220 may be coupled to a wearable device comprising, for example, shoes, a sleeve, a jacket, glasses, a glove, a ring, a watch, a wristband, a bracelet, an article of clothing, a hat, a vest, a belt, a helmet, a headband, and/or jewelry. In other embodiments, the haptic output device 220 may be coupled to a part of a user's body, such as a user's finger, arm, hand, foot, leg, head, back, chest, neck, and/or other body part.

In some embodiments, the haptic output devices 218, 220 may be configured to output a haptic effect simulating a texture or modulating the perceived coefficient of friction on a surface in response to a haptic signal. In one such embodiment, the haptic output devices 218, 220 may comprise an ultrasonic actuator. In another such embodiments, the haptic output devices 218, 220 may comprise an electrostatic actuator configured to use electrostatic attraction to output a haptic effect. The haptic effect may simulate a texture or modulate a perceived coefficient of friction along a surface. In such an embodiment, the electrostatic actuator may capacitively couple with a body part near or touching the electrostatic actuator. Varying the levels of attraction between the object and the conducting layer can vary the simulated texture or the perceived coefficient of friction along a surface.

In some embodiments, the haptic output devices 218, 220 comprise fluid configured for outputting a deformation haptic effect (e.g., for bending or deforming the computing device 201 or another surface). For example, the fluid may comprise a smart gel or a rheological (e.g., a magneto-rheological or electro-rheological) fluid. In response to stimulus, the smart gel or rheological fluid can change physical state and/or deform in shape. This may cause the computing device 201 or another surface to deform.

In other embodiments, the haptic output devices 218, 220 comprise a mechanical deformation device configured to physically push against and/or pull on a surface of the computing device 201 to cause a surface of the computing device 201 to deform in shape. Further still, other techniques or methods can be used to deform a surface. For example, the haptic output devices 218, 220 may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory alloys). In some embodiments, the haptic output devices 218, 220 are deformed, for example, air or fluid pockets, local deformation of materials, resonant mechanical elements, piezoelectric materials, micro-electromechanical systems ("MEMS") elements or pumps, thermal fluid pockets, variable porosity membranes, or laminar flow modulation.

Turning to memory 204, program components 224, 226, 228 are depicted to show how a device can be configured in some embodiments to provide a haptically-enabled neural interface. In this example, neural signal interpretation module 224 configures processor 202 to interpret sensor signals from neural sensor 232. For example, neural signal interpretation module 224 may receive sensor signals from neural sensor 232 and apply one or more characteristics of the sensor signals to an algorithm and/or a lookup table to determine a particular input and/or interaction with a virtual object in a virtual environment based on the sensor signals, e.g., as described in greater detail with respect to FIG. 5.

In some embodiments, the neural signal interpretation module 224 comprises a lookup table. The computing device 201 may be able to use the lookup table to map one or more characteristics of one or more sensor signals from the neural sensor(s) 232 to a stimulus perceived by the user. For example, the computing device 201 may use the lookup table to map a particular pattern of sensor signals from the neural sensor(s) 232, or one or more characteristics of one or more sensor signals from the neural sensor(s) 232, to a particular stimulus (e.g., a particular sound, image, smell, taste, or other stimulus perceived by the user).

In some embodiments, neural signals can be recorded (e.g., using electroencephalography) and mapped to particular stimuli in the lookup table. For example, the computing device 201 may output a known (e.g., predetermined) image, sound, smell, taste, and/or other stimulus. The user may perceive the stimulus, causing the neural sensor 232 to transmit sensor signals associated with the stimulus. The computing device 201 may receive sensor signals from the neural sensor 232 and associate one or more characteristics of the received sensor signals with the particular stimulus (e.g., in the lookup table). The computing device 201 may repeat this process any number of times, e.g., to construct the lookup table. Thereafter, the computing device 201 may use the lookup table to identify unknown stimuli perceived by the user.

Haptic effect determination module 226 represents a program component that analyzes data to determine a haptic effect to generate. Particularly, haptic effect determination module 226 may comprise code that determines, based on sensor signals from neural sensor 232 and/or an event occurring in a virtual environment, a haptic effect to output and code that selects one or more haptic effects to provide in order to simulate the effect. For example, different haptic effects may be selected based on the mood (e.g., happy, sad, scared, stressed, etc.) of the user, as determined based on sensor signals from the neural sensor 232.

In some embodiments, haptic effect determination module 226 may comprise code that determines, based on the size, color, location, movement, and/or other characteristics of a virtual object, a haptic effect to output and code that selects one or more haptic effects to provide in order to simulate the effect. For example, the processor 202 may determine, using neural signal interpretation module 224, that sensor signals from neural sensor 232 indicate that a virtual object should be manipulated within a virtual environment (e.g., a virtual skier should move in a particular manner down a virtual ski slope). The processor 202 may responsively move the virtual object within the virtual environment. The haptic effect determination module 226 may determine, based on the movement of the virtual object, one or more haptic effects to output. For example, the haptic effect determination module 226 may determine a haptic effect configured to simulate moguls, jumps, or other features of a virtual ski slope.

Haptic effect generation module 228 represents programming that causes processor 202 to transmit a haptic signal to haptic output device 218, 220 to generate the selected haptic effect. For example, haptic effect generation module 228 may access stored waveforms or commands to send to haptic output device 218. As another example, haptic effect generation module 228 may comprise algorithms to determine the haptic signal. Haptic effect generation module 228 may comprise algorithms to determine a target location for the haptic effect. The target location may comprise, for example, a location on the user's body in which to output the haptic effect.

Although the modules 224, 226, and 228 are depicted in FIG. 2 as program components within the memory 204, in some embodiments, modules 224, 226 and/or 228 may comprise hardware. For example, modules 224, 226 and/or 228 may comprise analog to digital converters, processors, microcontrollers, comparators, amplifiers, transistors, and other analog or digital circuitry.

Figure 3:
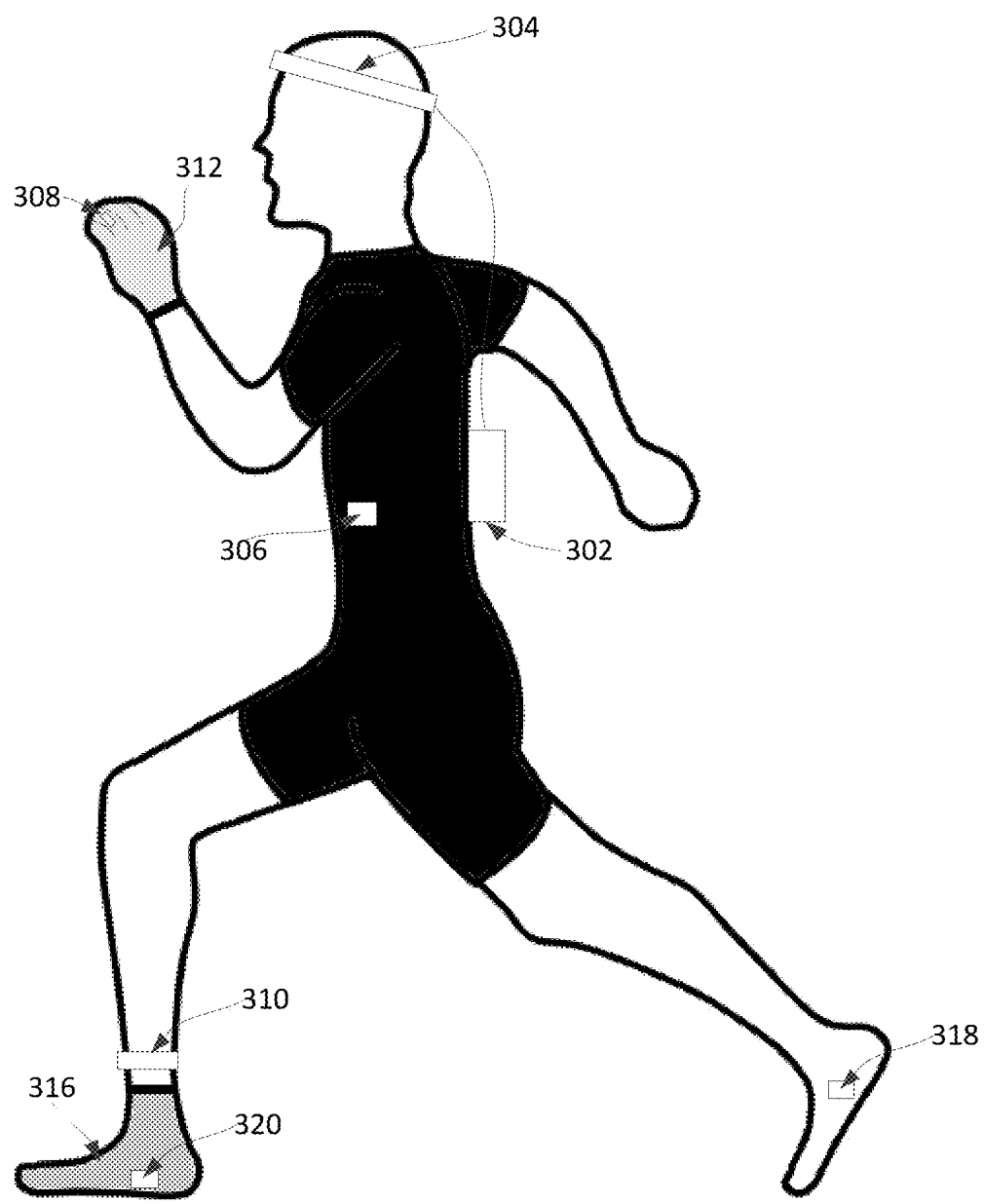
FIG. 3 shows an embodiment of a system for haptically-enabled neural interfaces.

FIG. 3 shows an embodiment of a system for haptically-enabled neural interfaces. A neural sensor 304 may transmit electrical signals to a computing device 302 in response to the user viewing, hearing, smelling, feeling, tasting, and/or otherwise being stimulated by a stimulus in the user's environment. Although the neural sensor 304 is depicted in FIG. 3 as positioned on the user's head for detecting signals from the user's brain, in other embodiments, the neural sensor 304 can be coupled to other portions of the user's body (e.g., arm, leg, hand, foot, back, spine, etc.) for detecting electrical signals output by, or propagating through, other portions of the user's nervous system.

The computing device 302 is configured to determine one or more inputs (e.g., commands) based on sensor signals from the neural sensor 304. For example, the computing device 302 may determine that a sensor signal comprises an amplitude, phase, frequency, waveform, duration, and/or other characteristic or combination of characteristics representative of a particular input. The computing device 302 may determine the input based on the characteristics. For example, the computing device 302 may determine the input by consulting a lookup table stored in memory that maps sensor signal characteristics to particular inputs.

In some embodiments, the computing device 302 may determine information about the user and/or receive input from the user via the sensor signals from the neural sensor 304. For example, the computing device 302 may determine that the user has a particular mood (e.g., happiness, fear, excitement, sadness, etc.); that the user is engaging in a particular mode of thought (e.g., creative, logical, emotional, etc.); that particular area(s) of the user's brain are stimulated (e.g., the frontal lobe, parietal lobe, temporal lobe, occipital lobe); that the user is being auditorally, tactilely, and/or visually stimulated; and/or other information about the user based on the sensor signals. The information may be, or otherwise comprise, the input.

In some embodiments, the computing device 302 executes one or more functions (e.g., digital operations) based on the input. A function may comprise, for example, manipulating and/or interacting with a virtual object in a virtual environment (e.g., moving a video game character in a virtual environment), purchasing an object (e.g., via the Internet), opening a webpage, initiating printing of a document, sending an alert or message, determining information about an object (e.g., by querying one or more servers), calling a phone number, taking a picture, saving data, selecting a program option or setting, recording a sound, outputting a sound, playing media content, sending data, and/or receiving data.

For example, in some embodiments, the computing device 302 is configured to execute an augmented reality application, a virtual reality application, a video game, and/or may generate a virtual user interface (e.g., a three-dimensional user interface) through which a user can interact with one or more virtual objects in a virtual environment. In some embodiments, the user can imagine a movement of the virtual object along a particular trajectory, an interaction with the virtual object, and/or a particular manipulation of the virtual object. The user's brain may responsively generate electrical signals, which can be received and interpreted by the computing device 302. In some embodiments, the computing device 302 may move the virtual object along the particular trajectory, generate a response to the interaction with the virtual object, and/or manipulate the virtual object in the particular fashion based on the electrical signals from the user's brain.

In some embodiments, the computing device 302 outputs one or more haptic effects based at least in part on the sensor signals from the neural sensor 304 (e.g., one or more inputs associated with the neural sensor 304). For example, the computing device 302 may output a haptic effect (e.g., a vibration) proportional to the amplitude or frequency of an electrical signal from the user's brain. As another example, the computing device 302 may determine, based on the sensor signals, that the user is viewing a particular color or object, hearing a particular sound, tasting a particular taste, and/or smelling a particular smell and output an associated haptic effect. For instance, the computing device 302 may determine that the user is viewing an object comprising blood or a red color and output an intense vibration (e.g., to signal danger).

In some embodiments, the computing device 302 may output haptic effects configured to enhance or reduce one or more sensations perceived by the user. For example, a user may interact with a surface (e.g., a table, chair, desk, road, floor, wall, etc.) comprising a particular characteristic (e.g., bumpiness). The neural sensor 304 may detect the electrical signals associated with the interaction and transmit associated sensor signals to the computing device 302. The computing device 302 may determine that the user is touching a bumpy surface based on the sensor signals. The computing device 302 may output a haptic effect configured to enhance the particular characteristic. For example, the computing device 302 may output, via a haptic output device 308 associated with the user's hand or finger, an intense vibration configured to make the surface feel more bumpy.

In some embodiments, the computing device 302 outputs a haptic effect based at least in part on a characteristic of a virtual object, a virtual environment, and/or an event occurring within the virtual environment. The event may comprise the presence of a virtual object (e.g., the presence of a virtual furniture piece in an augmented reality application); manipulation of a virtual object (e.g., moving or bouncing of a virtual object); a change in scale, location, orientation, color, or other characteristic of a virtual object; a virtual explosion, gunshot, and/or collision; an interaction between game characters; advancing to a new level; losing a life and/or the death of a virtual character; and/or traversing particular virtual terrain; etc.

For example, the computing device 302 may output one or more haptic effects configured to simulate a virtual terrain, the texture of a virtual object, the temperature of a virtual object, an impact or blow with a virtual object, virtual gun fire, etc. In some embodiments, the computing device 302 outputs the haptic effects via a haptic output device 318 associated with the user's foot, such as in a shoe, and/or a haptic output device 308 associated with the user's hand, such as in a glove 312. For instance, the computing device 302 may execute a virtual marital arts game in which the user can control a virtual ninja (e.g., with the user's brain). The computing device 302 may output a stinging sensation in response to the virtual ninja contacting a sharp virtual object (e.g., a virtual sword or shuriken). The computing device 302 may additionally or alternatively output a haptic effect configured to simulate an impact in response to the virtual ninja receiving a blow (e.g., with an object, fist, or foot), and/or a haptic effect configured to simulate a temperature (e.g., heat) in response to the virtual ninja approaching a virtual object comprising the temperature (e.g. lava).

As another example, the computing device 302 may execute a virtual racing game in which the user can control a virtual car via his or her brain. The computing device 302 may output one or more haptic effects in response to the virtual car driving over sand, a paved street, bumps or potholes, and/or the user winning or losing a round. For example, the computing device 302 may output a haptic effect configured to simulate a sand sensation to the user's foot (e.g., via haptic output device 318) in response to the virtual car driving over sand. The computing device 302 may output an intense vibration to the user's foot or chest (e.g., via haptic output device 318 and/or haptic output device 306) in response to the virtual car driving over bumps or potholes. The computing device 302 can output any number of haptic effects via any number and combination of haptic output devices 306, 308, 310, 318 (e.g., coupled to the user's body and/or associated with a wearable article).

In some embodiments, the computing device 302 outputs one or more haptic effects associated with a user interaction with an object in real space (e.g., a user contacting the object with a limb or body part). The object may comprise, for example, a button, knob, slider, and/or switch (e.g., a light switch). In some embodiments, the haptic effect is configured to confirm the user interaction. For example, the computing device 302 may output a vibration (via the haptic output device 308) configured to confirm that the user contacted or otherwise manipulated the object (e.g., flipped a light switch). This may help a user, for example, that has reduced sensitivity in the user's limbs (e.g., fingers) due to one or more medical conditions, determine that such a user interaction occurred.

In some embodiments, the computing device 302 may output a haptic effect associated with a manipulation (e.g., movement) of a body part (e.g., a limb) in real space. For instance, the user may attempt to manipulate the limb (e.g., to move the user's hand to a new position or contact a surface). In some embodiments, the user may be unable to see or otherwise detect whether or not the body part actually moved (e.g., if the user is blind). The computing device 302 may output a first haptic effect (e.g., a vibration) configured to confirm that the body part moved and/or a second haptic effect configured to notify the user that the body part did not move.

As another example, the user may use a body part to interact with one or more objects (e.g., a table or chair). The user may for some reason be unable to perceive tactile sensations. For instance, the user may have damaged nerves or may have lost all of, or a portion of, a limb. This may prevent the user from directly perceiving tactile sensations associated with the interaction and/or the object. For instance, the user may be unable to physically sense a texture or other characteristic associated with the object. The computing device 302 may cause the neural sensor 304 to stimulate the user's nervous system in a manner configured to cause the user to perceive the characteristic. For example, the computing device 302 may cause the neural sensor 304 to stimulate the user's brain in a manner configured to cause the user to perceive that the user is contacting a surface comprising a wood texture.

In some embodiments, the user may use an intermediary device, such as a prosthetic limb 316, to interact with one or more objects (e.g., a couch or wall). The user may use the intermediary device, for example, if the user has lost a limb. The intermediary device (and/or loss of the limb) may prevent the user from directly perceiving tactile sensations associated with the interaction and/or the object. For instance, the user may be unable to physically sense a texture or other characteristic associated with the object. In some embodiments, the intermediary device comprises a sensor 320 (e.g., a camera coupled to the prosthetic limb 316) configured to detect the characteristic of the object and transmit associated sensor signals to the computing device 302. For example, the sensor 320 may detect the texture of the object and transmit associated sensor signals to the computing device 302. The computing device 302 may receive the sensor signals and cause the neural sensor 304 to stimulate the user's nervous system in a manner configured to cause the user to perceive the characteristic. For example, the computing device 302 may cause the neural sensor 304 to stimulate the user's brain in a manner configured to cause the user to perceive that the user is contacting a surface comprising a brick texture.

In some embodiments, the computing device 302 may output a haptic effect associated with a manipulation (e.g., movement) and/or an attempted manipulation of a prosthetic limb 316. For instance, the user may attempt to manipulate the prosthetic limb 316 (e.g., to walk along a path). But the user may be unable to see or otherwise detect whether or not the prosthetic limb 316 actually moved (e.g., if the user is blind). The computing device 302 may output a first haptic effect (e.g., a vibration via the haptic output device 310) configured to confirm that the prosthetic limb 316 moved and/or a second haptic effect configured to notify the user that the prosthetic limb 316 did not move.

Figure 4:
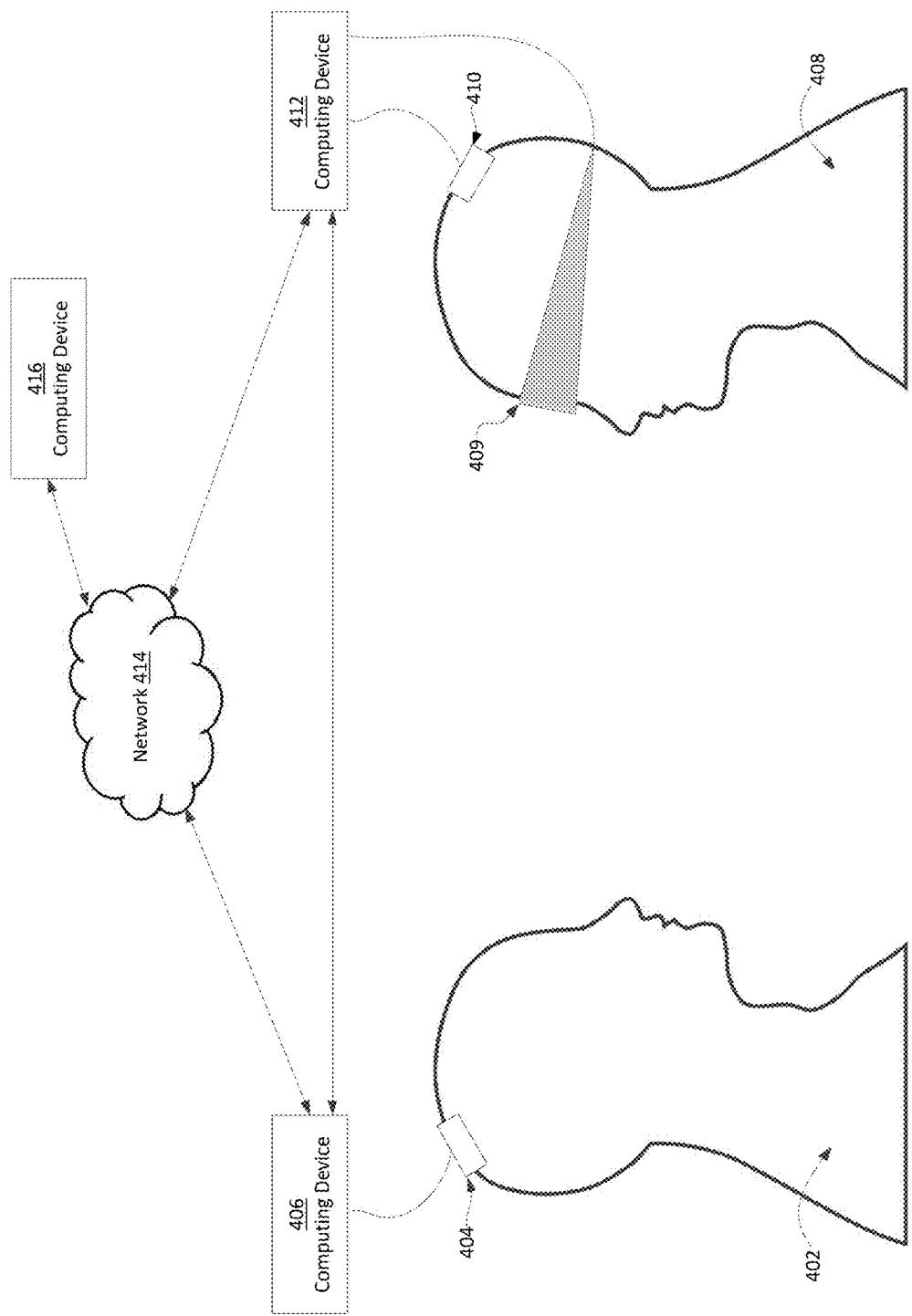
FIG. 4 shows another embodiment of a system for haptically-enabled neural interfaces.

FIG. 4 shows another embodiment of a system for haptically-enabled neural interfaces. The system comprises a first user 402. In this embodiment, a neural sensor 404 is coupled to the first user's head and in electrical communication with a first computing device 406. The system also comprises a second user 408. In this embodiment, a neural sensor 410 is coupled to the second user's head and in electrical communication with a second computing device 412. The user's may be in the same physical location or different physical locations (e.g., in different rooms, houses, cities, and/or countries).

In some embodiments, the computing devices 406, 412 communicate with each other via a wired or wireless interface. The computing devices 406, 412 can be in direct communication with one another (e.g., via Bluetooth) or indirect communication with one another. In some embodiments, the computing devices 406, 412 are in communication with one another via a network 414. The network 414 may be any suitable number or type of networks or links, including, but not limited to, a dial-up network, a local area network (LAN), wide area network (WAN), public switched telephone network (PSTN), a cellular network, a WiFi network, the Internet, an intranet or any combination of hard-wired and/or wireless communication links. The network 414 may comprise one or more sub-networks.

The computing devices 406, 412 may additionally or alternatively communicate with one or more remote servers (e.g., cloud servers, webservers, or other servers), databases, and/or computing devices 416 via the network 414. For example, the computing device 416 may execute a video game. The users 402, 408 may operate their respective computing devices 406, 412 (e.g., via brain signals) to play the game. The computing devices 406, 412 may transmit data to, and receive data from, the computing device 416 to effectuate game play.

In some embodiments, one or more of the computing devices 406, 412, 416 may execute a program (e.g., an augmented reality application, a virtual reality application, and/or a video game) configured to generate a virtual environment. The users 402, 408 may be able to interact with one another via the virtual environment. For example, the computing device 416 may execute a virtual military game in which the users 402, 408 may be able to control one or more virtual soldiers. In such an embodiment, each neural sensor 404, 410 may detect electrical signals from a respective user's nervous system and transmit associated sensor signals to the respective user's computing device 406, 412. The computing devices 406, 412 may manipulate the same virtual object or different virtual objects within the virtual environment based on the sensor signals. For example, the computing devices 406, 412 may manipulate different virtual soldiers in the military game based on the sensor signals. This may allow the user's to manipulate the virtual objects using their brains.

The computing devices 406, 412 are in electrical communication with one or more haptic output devices, e.g., as depicted in FIG. 3. As discussed above, in some embodiments, the neural sensors 404, 410 can be, or can include, the haptic output devices. The computing devices 406, 412 may output the same haptic effect, or different haptic effects (e.g., vibrations, textures, stinging sensations, and/or stroking sensations), to each respective user 402, 408. For example, in the military game embodiment described above, in response to an explosion occurring at a location substantially equidistant from both users' virtual soldiers, the computing devices 406, 412 may output the same haptic effect (e.g., a vibration) to the users 402, 408. The computing device 406 may additionally or alternatively output a haptic effect (e.g., a vibration) to the user 402 in response to the first user's virtual character performing a task (e.g., firing a virtual weapon), while the computing device 412 may output no haptic effect (e.g., because the second user's virtual character is not holding the virtual weapon and/or is a particular distance from the virtual weapon).

In some embodiments, the computing device 406 is configured to detect (e.g., via neural sensor 404) one or more electrical signals from a nervous system of a first user 402 associated with a sound, visual, taste, tactile sensation, smell, and/or other sensation perceived by the first user 402. The computing device 406 is configured to transmit data associated with the sensation to another computing device 412. The other computing device 412 may receive the data and generate one or more sensations perceivable by the second user 408 based on the data. For example, the computing device 412 may cause the neural sensor 410 to stimulate the second user's brain in a manner configured to cause the second user 408 to perceive the sensation. Thus, two or more users 402, 408 may be able to share sensations among each other.

For example, the user 402 may interact with object in real space (e.g., an animal, such as a cat) or in a virtual environment, and user's brain may responsively generate electrical signals associated with the object (e.g., the texture of the fur, a purring sound made by the cat, and/or visually what the cat looks like). The computing device 406 may transmit associated data to a remote computing device 412. The computing device 412 may output one or more sensations to the second user 408 based on the data. For example, the computing device 412 may output a haptic effect, e.g., configured to simulate the texture of the object (e.g., the texture of the cat's fur). The computing device 412 may additionally or alternatively output a sound, e.g., configured to simulate a sound made by the object (e.g., the purring of the cat). The computing device 412 may additionally or alternatively output a visual, e.g., configured to simulate what the object looks like. This may allow a remote user 408 to perceive one or more characteristics of the object and/or one or more sensations perceived by the first user 402.

As another example, a computing device 412 may output a virtual environment (e.g., via a display 409, such as augmented reality glasses or goggles), such as an augmented reality environment or a virtual reality environment. In some embodiments, the user 408 can touch or otherwise manipulate a virtual object in the virtual environment. For example, the user 408 may reach out and touch a location in real space corresponding to the virtual object in the virtual environment. In some embodiments, the computing device 412 is configured to detect the manipulation of the virtual object (e.g., via one or more sensors, such as a camera, depth sensor, range sensor, etc.). The computing device 412 may transmit data associated with the virtual object and/or manipulation of the virtual object to a remote computing device 406. In some embodiments, the computing device 406 may receive the data and responsively output one or more sensations to the first user 402 based on the data. For example, the computing device 406 may output a haptic effect, e.g., configured to simulate the texture of the virtual object (e.g., the texture of a virtual pet).

As still another example, the user's 402, 408 may be soldiers in a warzone. Each of the user's 402, 408 may be able to explore different parts of the battlefield and share, via computing devices 406, 412, sensations that they perceive. For example, as the user 402 enters any enemy stronghold, the computing device 406 may transmit associated data to the computing device 412, which may output one or more effects configured to simulate the sounds, tastes, smells, visuals, tactile, and/or sensations perceived by the first user 402. For example, the computing device 412 may output a sound based on a gunshot perceived by the first user 402. The computing device 412 may additionally or alternatively output a haptic effect (e.g., a vibration) configured to, e.g., indicate a direction from which the gunshot was fired (as perceived by the first user 402). This may quickly (e.g., substantially instantaneously) communicate to the second user 408 that the first user 402 is in distress, e.g., so the second user 408 can provide support.

As yet another example, in the warzone embodiment described above, the first user 402 may see that an enemy soldier is approaching the second user 408 (e.g., from behind). The computing device 406 may detect (e.g., via neural sensor 404) electrical signals from the first users brain indicative of this visual, and transmit associated data to the computing device 412. The computing device 412 may output a visual (e.g., of the enemy solider) on the display 409, a sound, and/or a haptic effect configured to, e.g., notify the second user 408 of danger. This may allow the first user 402 to quickly communicate valuable and potentially lifesaving information to the second user 408, e.g., without having to interact with physical user interface components (e.g., buttons, switches, knobs) of a computing device 406.

Illustrative Methods for Haptically-Enabled Neural Interfaces

Figure 5:
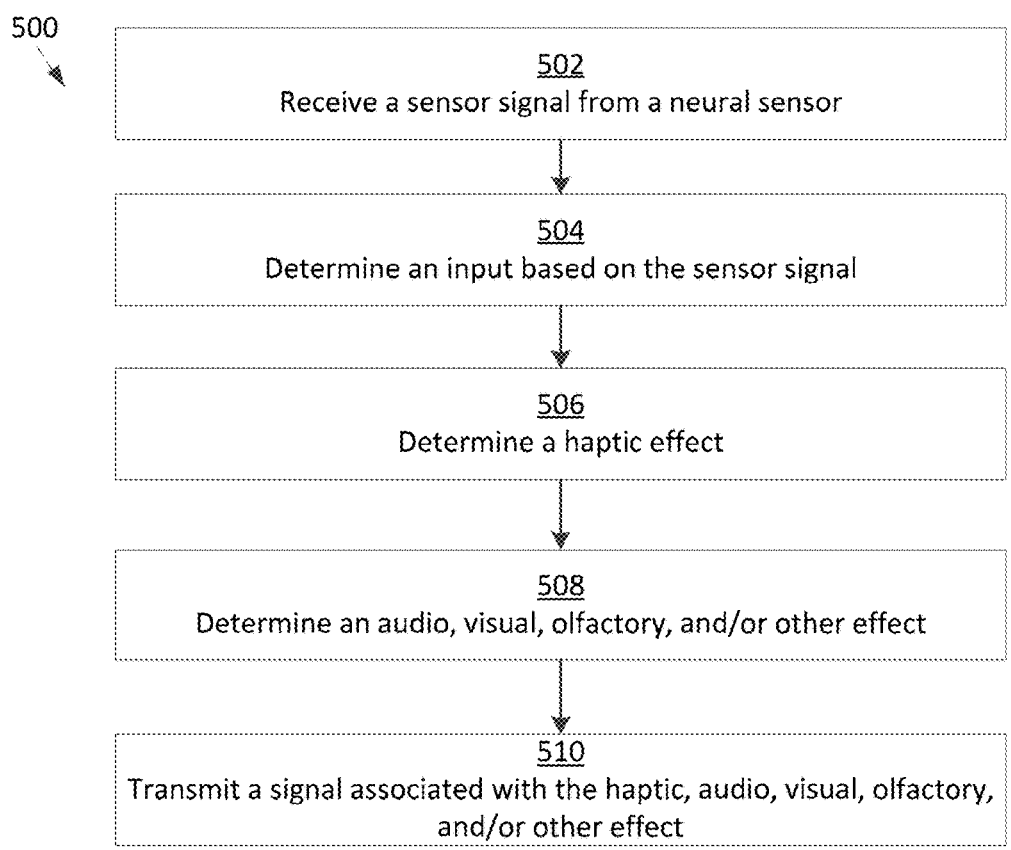
FIG. 5 is a flow chart of steps for performing a method for providing haptically-enabled neural interfaces according to one embodiment.

FIG. 5 is a flow chart of steps for performing a method for providing haptically-enabled neural interfaces according to one embodiment. In some embodiments, the steps in FIG. 5 may be implemented in program code that is executed by a processor, for example, the processor in a general purpose computer, a mobile device, or a server. In some embodiments, these steps may be implemented by a group of processors. In some embodiments one or more steps shown in FIG. 5 may be omitted or performed in a different order. Similarly, in some embodiments, additional steps not shown in FIG. 5 may also be performed. The steps below are described with reference to components described above with regard to computing device 201 shown in FIG. 2.

The method 500 begins at step 502 when the processor 202 receives a sensor signal from a neural sensor 232. The neural sensor 232 is configured to detect one or more electrical signals (e.g., electromagnetic waves) output by, and/or propagating through, a user's nervous system and transmit associated sensor signals to the processor 202. The sensor signal may comprise data associated with a sensation (e.g., sound, visual, taste, tactile sensation, smell, etc.) perceived by the user. For example, in one embodiment, the data may comprise data associated with the texture of an object (e.g., a piece of wood) perceived by the user.

The sensor signal may be an analog signal or a digital signal. In some embodiments, the sensor signal may be encoded with data associated with the electrical signals output by the user's brain. For example, the neural sensor 232 may use pulse-width modulation, frequency modulation, amplitude modulation, and/or any other technique to encode data within the sensor signal.

The method 500 continues at step 504 when the processor 202 determines an input based on the sensor signal. An input, as used herein, comprises any information provided to the processor 202 by the user. For example, the input may comprise a user interaction with a virtual object in a virtual environment.

In some embodiments, the processor 202 determines that a sensor signal comprises one or more characteristics (e.g., an amplitude, phase, frequency, waveform, duration, and/or other characteristic) representative of a particular input. In some embodiments, the processor 202 may rely on programming contained in the neural signal interpretation module 224 to determine the input based on the sensor signal. For example, the neural signal interpretation module 224 may comprise a lookup table. The processor 202 may consult the lookup table to determine the input based on one or more characteristics of the sensor signal. For example, the processor 202 may consult the lookup table and determine that the input comprises the user perceiving a particular tactile sensation based on the amplitude and/or frequency of the sensor signal (and/or digital data encoded within the sensor signal). In other embodiments, the processor 202 may apply an algorithm to determine the input based on one or more characteristics of the sensor signal. For example, the neural signal interpretation module 224 may comprise one or more algorithms usable by the processor 202 to determine the input based on the sensor signal.

The processor 202 may use any number and combination of techniques to determine an input based on the sensor signals. For example, the processor 202 may use a combination of lookup tables and algorithms to determine inputs based on the sensor signals. In some embodiments, users may have "input profiles" in which a user can determine and save in memory 204 a "profile" of the inputs the user would like associated with particular sensor signals. For example, in some embodiments, a user can select from a list of available inputs and associate one of these inputs with a particular sensor signal, such as a high-magnitude high-frequency sensor signal. In such an embodiment, the processor 202 may consult with the user's input profile to determine the input based on the sensor signal.

The method 500 continues at step 506 when the processor 202 determines a haptic effect. The processor 202 determines the haptic effect based at least in part on a characteristic (e.g., the type) of the input and/or the sensor signal. For instance, in one embodiment, the processor 202 may determine a haptic effect comprising a vibration if the input is associated with the user perceiving a bumpy object.

In some embodiments, the processor 202 determines the haptic effect based at least in part on an event. The event may occur in real space, on a computing device, and/or within a virtual environment. For example, an event may comprise program activity (e.g., game activity); an interaction with the computing device 201 (e.g., tilting or moving the mobile device, interacting with the touch screen display); an interaction with a virtual object in a virtual environment; a change in status in the computing device 201; receiving data; sending data; and/or movement of a user's body part (e.g., an arm, leg, or a prosthetic limb).

For example, the processor 202 may manipulate and/or interact with (e.g., move) a user's virtual character within a virtual environment based on the sensor signal. The processor 202 may further determine a haptic effect based at least in part on the manipulation and/or interaction. For example, if the manipulation and/or interaction results in the user's virtual character colliding with another virtual object (e.g., a tree, vehicle, and/or another virtual character), the processor 202 may determine a haptic effect comprising an intense vibration.

In some embodiments, the computing device 201 may store associated "haptic profiles" in which a user can determine and save in memory 204 a "profile" of the haptic effects the user would like associated with particular inputs. For example, in one embodiment, a user can select from a list of options which haptic effect the user would like associated with particular inputs, such inputs associated with the user seeing a particular visual, hearing a particular sound, manipulating a particular virtual object, etc. In some embodiments, the list may comprise, for example, haptic effects such as pulsed vibration, low-magnitude vibration, or a simulated texture. In some embodiments, the processor 202 may consult with the user's haptic profile to determine which haptic effect to generate. For example, if the user's haptic profile associates a visual comprising a virtual enemy soldier (e.g., in a virtual military game) with a haptic effect comprising a pulsed vibration, in response to the user viewing a virtual enemy soldier, the processor 202 may determine a haptic effect comprising a pulsed vibration.

In some embodiments, the processor 202 determines a plurality of haptic effects. Each of the plurality of haptic effects may be associated with a different characteristic of the input and/or the associated sensor signal. For example, the processor 202 may determine a first haptic effect (e.g., a vibration) based on the amplitude of the sensor signal from which the input was determined. The magnitude of the sensor signal may be indicative of how strongly the user perceived a particular stimulus (e.g., how strongly the user perceived a blow to the head by an opponent in a boxing match). The processor 202 may also determine a second haptic effect associated with digital data encoded in the sensor signal. The digital data may be representative of the type of the stimulus (e.g., a blow to the head). In some embodiments, the processor 202 may transmit signals associated with the haptic effects to a remote device configured to output the plurality of haptic effects to another user. Based on the plurality of haptic effects, the other user may be able to determine one or more characteristics of the stimulus (e.g., that the stimulus was a blow to the head and the user perceived it strongly).

In some embodiments, the processor 202 determines that a specific haptic effect has a higher priority than another haptic effect, and thus to output only the high priority effect. For instance, the processor 202 may determine that a haptic effect associated with a first type of the stimulus has a higher priority than another haptic effect associated with a second type of stimulus, and thus output only the haptic effect associated with the first type of the stimulus. Alternatively, the processor 202 may determine that only the most intense effect should be output. Thus, in some embodiments, the processor may determine a low intensity vibration and a high intensity vibration, but output only the high intensity vibration.

The method 500 continues at step 508 when the processor 202 determines an audio, visual, olfactory, taste, and/or other effect (e.g., based at least in part on the sensor signal). The processor 202 may determine the effect using, e.g., any of the methods described in step 506 with respect to determining a haptic effect (e.g., such as algorithms and/or lookup tables).

For example, the sensor signal may be indicative of the user viewing a particular visual and/or hearing a corresponding sound. If the sound comprises a gunshot, the processor 202 may consult a lookup table and determine an audio effect comprising a gunshot. The processor 202 may transmit a signal associated with the audio effect to a remote device configured to output the audio effect to a remote user. Thus, the remote user can hear what the original user is hearing.

As another example, the processor 202 may consult a lookup table and/or apply an algorithm to determine that the user has a particular mood, such as scared, happy, stressed, etc. The processor 202 may determine an audio, visual, olfactory, and/or other sensation configured to alter the user's mood. For example, the processor 202 may determine a visual configured to calm the user (e.g., the visual of a puppy), a smell or taste configured to increase the user's happiness level (e.g., the smell or taste of apple pie), and/or a sound configured to relax the user (e.g., the sound of the ocean).

The method 500 continues at step 510 when the processor 202 transmits a signal associated with the haptic, audio, visual, olfactory, taste, and/or other effect. In some embodiments, the signal may be generated by accessing a stored algorithm and inputting parameters associated with the effect. For example, an algorithm may output data for use in generating a drive signal (e.g., for an actuator or speaker) based on amplitude and frequency parameters. As another example, a signal may comprise data configured to be decoded by a haptic output device, speaker 222, display 216, olfactory device 234, taste device, and/or other sensation-generating device. For instance, a haptic output device 218, 200 may itself respond to commands specifying parameters such as amplitude and frequency.

The processor 202 may transmit the signal to a haptic output device 218, 220, a speaker 222, a display 216, an olfactory device 234, a taste device, and/or another device configured to generate a sensation. In some embodiments, the signal may comprise a haptic signal configured to cause a haptic output device to generate the haptic effect. The signal may additionally or alternatively comprise an audio signal configured to cause a speaker 222 to output the audio effect; a video signal configured to cause display 216 to output the visual effect; an olfactory signal configured to cause an olfactory device 234 to output a smell; and/or a taste signal configured to cause a taste device to output a particular taste.

In some embodiments, the processor 202 transmits the signal to the neural sensor 232. The neural sensor 232 may be able to stimulate the user's nervous system to cause the user to perceive the effect (e.g., taste, smell, visual, sound, and/or apparent haptic effect). For example, the processor 202 can transmit a high level command to the neural sensor 232 configured to cause the neural sensor 232 to output a particular combination of electrical pulses to the user's brain. The electrical pulses can be configured to cause the user to perceive one or more of the effects.

In some embodiments, the processor 202 transmits the signal to a remote device. The remote device may comprise a neural interface usable by a remote user. The remote device may be configured to receive the signal and output the haptic, audio, visual, olfactory, taste, and/or other effect. For example, the remote device may receive the signal and output an associated sound, smell, and taste to the remote user. In such an embodiment, a remote user may be able to perceive sensations (or modified versions of the sensations) sensed by the original user.

Advantages of Haptically-Enabled Neural Interfaces

There are numerous advantages to haptically-enabled neural interfaces. Such systems may provide a more immersive experience as a user interacts with a virtual object in a virtual environment (e.g., using signal from the user's brain), thereby increasing overall user satisfaction. For example, in some embodiments, an augmented reality application may output a virtual dog overlaying camera data. In response to the user envisioning petting the virtual dog, the haptically-enabled neural interface may output a haptic effect configured to simulate the fur of the virtual dog. As a result, the user may perceive the virtual dog as more realistic.

In some embodiments, haptically-enabled neural interfaces may provide a confirmation to a user. For example, in some embodiments, an augmented reality application may output a virtual object comprising a button. As a user envisions interacting with the virtual button, the computing device may output a haptic effect (e.g., to a haptic output device coupled to the user's finger), thereby confirming a button press. In some embodiments, confirmatory haptic feedback may provide an enhanced user experience.

In some embodiments, haptically-enabled neural interfaces may allow the user to perceive characteristics of objects the user may otherwise be unable to feel. For example, the user may be able to interact with a textured object using a prosthetic limb and receive haptic feedback configured to simulate the texture of the object. As another example, the user may attempt to move a prosthetic limb and receive haptic feedback confirming the movement and/or otherwise notifying the user of a characteristic of the movement (e.g., how far the prosthetic limb moved or that the prosthetic limb did not move).

In some embodiments, haptically-enabled neural interfaces may allow multiple users to communicate at a high rate of speed, e.g., without having to physically interact with a physical user interface device (e.g., a button, switch, knob, keyboard, and/or touch-sensitive surface). For example, a first neural interface may be able to detect that a first user is injured (e.g., in a car accident or wounded in battle) and/or unconscious and transmit associated data to a second user's neural interface. The second user's neural interface may output one or more effects configured to notify the second user of the medical and/or physiological status of the second user, such as to notify the second user of the injury and/or emergency. This may, for example, allow the second user to provide aid to the first user.

In some embodiments, one user may be able to perceive characteristics of objects contacted or otherwise manipulated by another user. For example, a first user may be shopping and find an article of clothing (e.g., a shirt, pants, socks, hat, jacket, dress, shoe, etc.) that the first user thinks a second user might like. The first user can interact with the garment and perceive the texture and/or material of the garment. The first user's neural interface can transmit data associated with the interaction and/or article of clothing to the second user's neural interface. The second user's neural interface may output one or more effects configured to cause the second user to see, feel, smell, and/or otherwise sense the characteristics of the article of clothing. This may allow the second user to determine if the first user should purchase the article of clothing. Thus, the users may be able to share sensations among one another, e.g., to make more informed purchasing decisions.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computing device comprising:
    a processor; and
    a memory comprising program code that is executable by the processor to cause the processor to:
        receive a sensor signal from a neural interface configured to detect an electrical signal associated with a nervous system;
        determine an interaction with an object based on the sensor signal;
        determine a haptic effect based at least in part on the interaction with the object;
        transmit a haptic signal to a first device, the first device being configured to receive the haptic signal and output the haptic effect via a first haptic output device; and
        transmit the haptic signal to a second device that is remote from the first device, the second device being configured to receive the haptic signal and output the haptic effect via a second haptic output device.

2. The computing device of claim 1, wherein the neural interface comprises a sensor configured to detect the electrical signal associated with the nervous system and transmit the sensor signal, the sensor comprising at least one of: an electroencephalogram (EEG) electrode, a spectroscopic sensor, a magnetic resonance imaging system, or a capacitive sensor.

3. The computing device of claim 1, wherein the object is a virtual object in an augmented reality environment, and wherein the memory further comprises program code that is executable by the processor to cause the processor to determine the haptic effect based at least in part on an event in the augmented reality environment.

4. The computing device of claim 1, wherein the the object is an intermediary device, and the interaction with the object comprises a movement of the intermediary device.

5. The computing device of claim 4, wherein the haptic effect is configured to simulate a characteristic of a surface contacted by the intermediary device.

6. The computing device of claim 1, wherein the neural interface is a first neural interface, and wherein the second device comprises a second neural interface usable by a remote user.

7. The computing device of claim 1, wherein the computing device is the first device.

8. A method comprising:
receiving, by a processor of a computing device, a sensor signal from a neural interface configured to detect an electrical signal associated with a nervous system;
determining, by the processor, an interaction with an object based on the sensor signal;
determining, by the processor, a haptic effect based at least in part on the interaction with the object;
transmitting, by the processor, a haptic signal associated with the haptic effect to a first device, the first device being configured to receive the haptic signal and output the haptic effect via a first haptic output device; and
transmitting, by the processor, the haptic signal associated with the haptic effect to a second device that is remote from the first device, the second device being configured to receive the haptic signal and output the haptic effect via a second haptic output device.

9. The method of claim 8, wherein the neural interface comprises a sensor configured to detect the electrical signal associated with the nervous system and transmit the sensor signal, the sensor comprising at least one of: an electroencephalogram (EEG) electrode, a spectroscopic sensor, a magnetic resonance imaging system, or a capacitive sensor.

10. The method of claim 8, wherein the object is a virtual object in an augmented reality environment, and wherein the haptic effect is based at least in part on an event in the augmented reality environment.

11. The method of claim 8, wherein the object is an intermediary device, and the interaction with the object comprises a movement of the intermediary device.

12. The method of claim 11, wherein the haptic effect is configured to simulate a characteristic of a surface contacted by the intermediary device.

13. The method of claim 8, wherein the neural interface is a first neural interface, and wherein the second device comprises a second neural interface.

14. The method of claim 8, wherein the neural interface is the first haptic output device, and wherein the neural interface outputs the haptic effect by electrically stimulating a portion of the nervous system.

15. The method of claim 8, further comprising:
determining a stimulus that a user is to perceive based on the interaction with the object, the stimulus being a taste, smell, or sound; and
electrically stimulating a portion of the nervous system using the neural interface to cause the user to perceive the stimulus.

16. The method of claim 8, wherein the haptic effect is a first haptic effect, and further comprising:
determining a stimulus that a user previously perceived based on the sensor signal from the neural interface;
determining a second haptic effect based on the stimulus that the user previously perceived; and
outputting the second haptic effect.

17. The method of claim 16, wherein the stimulus that the user previously perceived includes at least one of a smell, a taste, or a sound.

18. The method of claim 8, further comprising:
determining a stimulus that a user previously perceived based on the sensor signal from the neural interface; and
transmitting information associated with the stimulus to the second device.

19. The method of claim 8, further comprising:
determining a medical status or physiological status of a user based on the sensor signal from the neural interface; and
transmitting information associated with the medical status or physiological status to the second device.

20. The method of claim 8, further comprising:
determining a texture of the object; and
configuring the haptic effect to enhance a user's perception of the texture of the object.

21. A non-transitory computer readable medium comprising program code, which when executed by a processor is configured to cause the processor to:
receive a sensor signal from a neural interface configured to detect an electrical signal associated with a nervous system;
determine an interaction with an object based on the sensor signal;
determine a haptic effect based at least in part on the interaction with the object;
transmit a haptic signal associated with the haptic effect to a first device, the first device being configured to receive the haptic signal and output the haptic effect via a first haptic output device; and
transmit the haptic signal associated with the haptic effect to a second device that is remote from the first device, the second device being configured to receive the haptic signal and output the haptic effect via a second haptic output device.

22. The non-transitory computer readable medium of claim 21, wherein the neural interface comprises the first haptic output device.

23. The non-transitory computer readable medium of claim 21, wherein the object is a virtual object in an augmented reality environment, and wherein the haptic effect is based at least in part on an event in the augmented reality environment.

24. The non-transitory computer readable medium of claim 21, wherein the object is a prosthetic limb, and the interaction with the object comprises a movement of the prosthetic limb.

* * * * *